United States Patent [19]
Alexander et al.

[11] Patent Number: 5,586,704
[45] Date of Patent: Dec. 24, 1996

[54] SHOULDER HOLSTER AND METHOD OF CARRYING A PORTABLE TELEPHONE NEAR THE BODY OF A USER

[75] Inventors: Tommy Alexander, 419 Durham Rd., Stanley, N.C. 28164; Shawn B. Jenkins, Charlotte, N.C.

[73] Assignee: Tommy Alexander, Stanley, N.C.

[21] Appl. No.: 399,893

[22] Filed: Mar. 7, 1995

[51] Int. Cl.$^6$ ............................................ A45F 5/00
[52] U.S. Cl. ..................... 224/605; 224/623; 224/624; 224/901.8; D3/218; 379/451
[58] Field of Search ............................. 224/191, 202, 224/203, 204, 206, 208, 222, 257, 258, 901, 930, 252, 253; 379/430; D3/218; 455/89, 90, 351; D14/250, 251, 253

[56] References Cited

U.S. PATENT DOCUMENTS

| | | | |
|---|---|---|---|
| D. 317,452 | 6/1991 | Garab | D14/250 |
| D. 346,494 | 5/1994 | Graham et al. | D3/218 |
| D. 346,495 | 5/1994 | Morrissey | D3/218 |
| D. 362,541 | 9/1995 | Elder et al. | D3/218 |
| D. 369,903 | 5/1996 | Tetrault | D3/218 |
| 1,781,162 | 11/1930 | Clark | 224/206 |
| 2,089,402 | 8/1937 | Murray. | |
| 2,299,058 | 10/1942 | Mitchell | 250/14 |
| 2,372,971 | 4/1945 | Moore. | |
| 2,408,966 | 10/1946 | Brede. | |
| 2,571,514 | 10/1951 | Andrews | 250/14 |
| 3,482,748 | 12/1969 | Roberts, Jr. . | |
| 3,648,906 | 3/1972 | Ross . | |
| 3,868,573 | 2/1975 | Holcomb et al. | 379/430 |
| 4,323,999 | 4/1982 | Yoshizawa | 369/19 |
| 4,347,956 | 9/1982 | Berger | 224/257 |
| 4,539,700 | 9/1985 | Sato | 381/90 |
| 4,764,962 | 8/1988 | Ekman et al. | 224/901 |
| 4,785,984 | 11/1988 | Seitz-Gangemi | 224/259 |
| 4,974,762 | 12/1990 | Boretsky et al. | 224/222 |
| 5,263,618 | 11/1993 | Talavera | 224/206 |
| 5,358,159 | 10/1994 | Lundie, Jr. | 224/206 |
| 5,381,922 | 1/1995 | Gladman et al. | 224/252 |

OTHER PUBLICATIONS

JC Whitney Cat., Spring 1996, jacket for a cellular phone. 1996.

*Primary Examiner*—Henry J. Recla
*Assistant Examiner*—Gregory M. Vidovich
*Attorney, Agent, or Firm*—W. Thad Adams III, P.A.

[57] ABSTRACT

A shoulder holster, and method of carrying a telephone near the body of a user for storage of and ready access to the telephone by the user are provided. The holster includes a supporting shoulder strap extending generally over the shoulder and under the arm of the user during wear. A telephone mounting panel is attached to respective ends of the shoulder strap, and resides near the chest of the user during wear. Complementary fasteners located on the telephone and on the mounting panel serve to removably attach the telephone to the mounting panel.

4 Claims, 2 Drawing Sheets

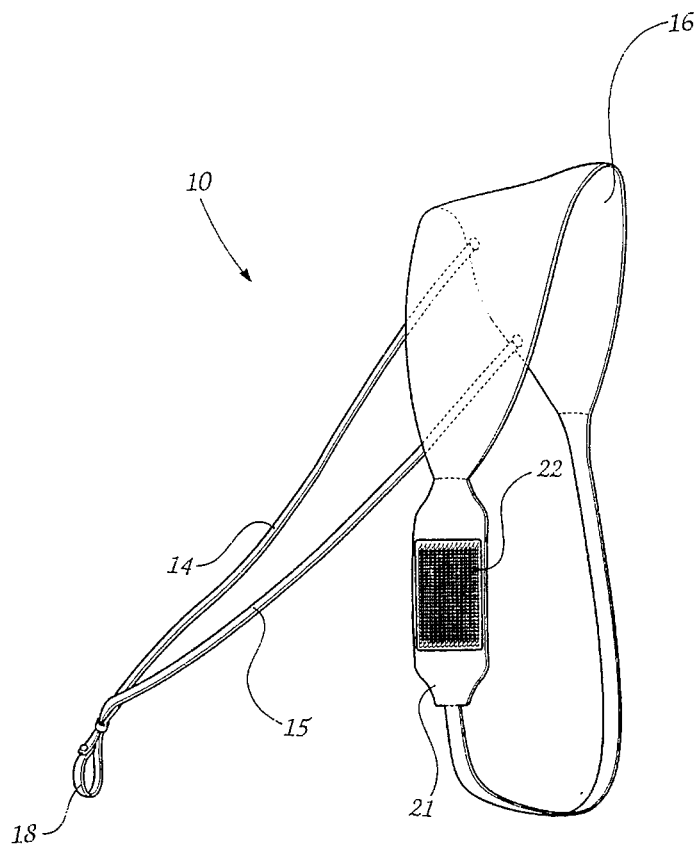
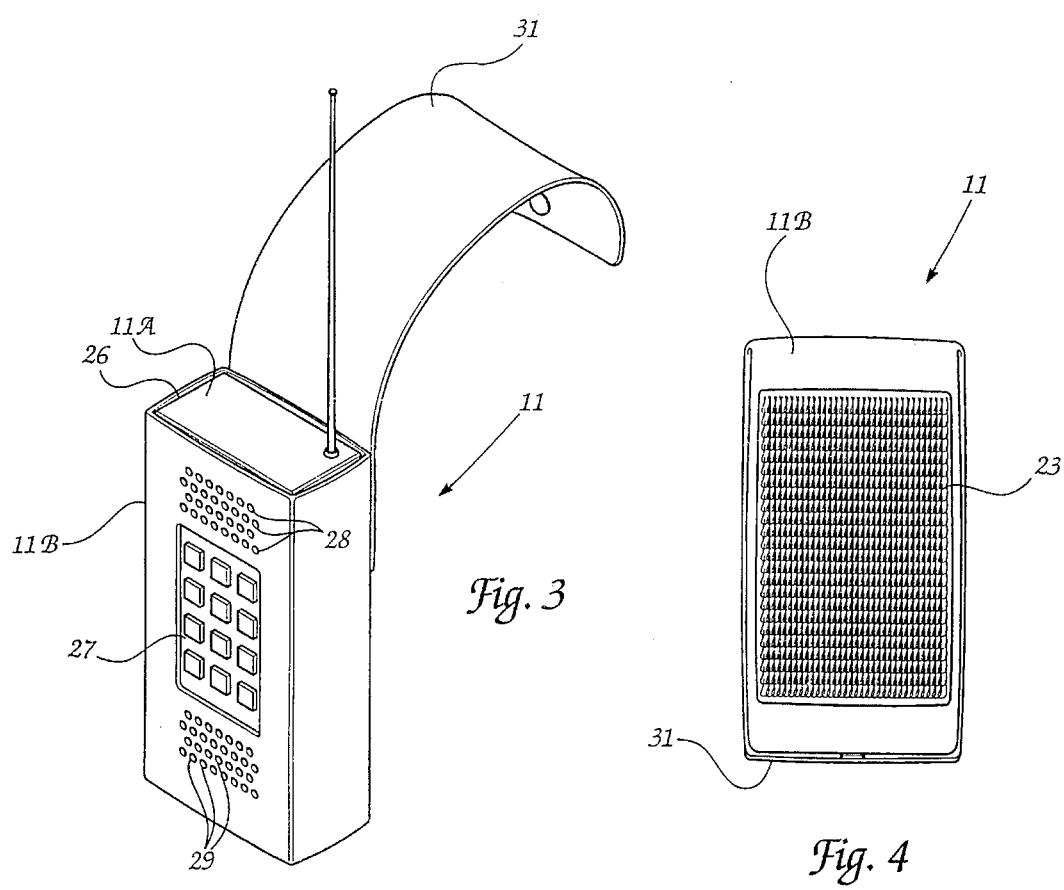

SHOULDER HOLSTER AND METHOD OF CARRYING A PORTABLE TELEPHONE NEAR THE BODY OF A USER

TECHNICAL FIELD AND BACKGROUND OF THE INVENTION

This invention relates to a shoulder holster and method of carrying a portable telephone. The invention locates the telephone near the body of a user for safe storage, and for ready and convenient access to the telephone by the user. The telephone is easily attached to and removed from the shoulder holster for use.

In view of the current popularity and increasing use of portable cellular telephones, a need has developed by users for secure and convenient means to hold the telephone near the body as the user travels throughout the day. Presently, many users simply place the telephone in a coat pocket or purse for storage during periods of non-use. This makes it generally difficult to quickly answer in-coming calls, often causing embarrassment to the user in crowded public areas. Moreover, portable telephones stored in pockets or purses are more likely to be lost, misplaced, or stolen.

The present invention addresses these and other such problems by providing a shoulder holster for carrying the telephone near the body of the user. The telephone is safely stored during periods of non-use, and is conveniently and readily accessed by the user when receiving in-coming calls or when placing out-going calls. The telephone is easily attached to and removed from the holster for use.

SUMMARY OF THE INVENTION

Therefore, it is an object of the invention to provide a shoulder holster for carrying a portable telephone.

It is another object of the invention to provide a shoulder holster which locates the telephone near the body of a user, and which provides convenient and ready access to the telephone by the user.

It is another object of the invention to provide a shoulder holster for a portable telephone which is easily attached to and removed from the holster for use.

It is another object of the invention to provide a shoulder holster for a portable telephone which helps reduce the likelihood of the telephone being lost, misplaced, or stolen.

It is another object of the invention to provide a method of carrying a portable telephone near the body of a user for storage of and ready access to the telephone by the user.

These and other objects of the present invention are achieved in the preferred embodiments disclosed below by providing portable telephone means, and a shoulder holster for carrying the telephone means. The holster locates the telephone means near the body of a user for storage of and ready access to the telephone means by the user. The holster includes a supporting shoulder strap extending generally over the shoulder and under the arm of the user during wear. A telephone mounting panel is attached to respective ends of the shoulder strap, and resides near the chest of the user during wear. Attachment means removably attaches the telephone means to the mounting panel.

According to one preferred embodiment of the invention, the telephone means is a telephone, and a protective jacket for holding the telephone therein.

According to another preferred embodiment of the invention, the attachment means includes complementary hook and loop fasteners located, respectively, on a back wall of the jacket and on a front surface of the mounting panel. The attachment means removably attaches the telephone means to the mounting panel.

According to yet another preferred embodiment of the invention, a front wall of the jacket includes a plurality of transmitter and receiver holes located at opposite ends thereof for residing adjacent to a transmitter and receiver portion of the telephone.

According to yet another preferred embodiment of the invention, the front wall of the jacket further includes a center opening for exposing a plurality of push buttons located on the telephone.

According to yet another preferred embodiment of the invention, the jacket includes a top opening for receiving the telephone, and a downwardly extending flap for removably covering the top opening and a front wall of the jacket.

According to yet another preferred embodiment of the invention, the holster includes a side strap having first and second ends. The first end is attached to the shoulder strap, and the second end defines a loop for receiving a belt of the user.

An embodiment of the method according to the invention comprises the steps of providing a shoulder holster having a supporting shoulder strap extending generally over the shoulder and under the arm of the user during wear. A telephone mounting panel is attached to respective ends of the shoulder strap. The mounting panel resides near the chest of the user during wear. Removable attachment means are provided for removably attaching the telephone means to the mounting panel.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 2 is a perspective view of the shoulder holster shown in FIG. 1;

FIG. 3 is a perspective view of the telephone means for being carried by the shoulder holster; and FIG. 4 is a back elevational view of the telephone means, and showing the fasteners for being mated with complementary fasteners of the shoulder holster.

DESCRIPTION OF THE PREFERRED EMBODIMENT AND BEST MODE

Figure 1:
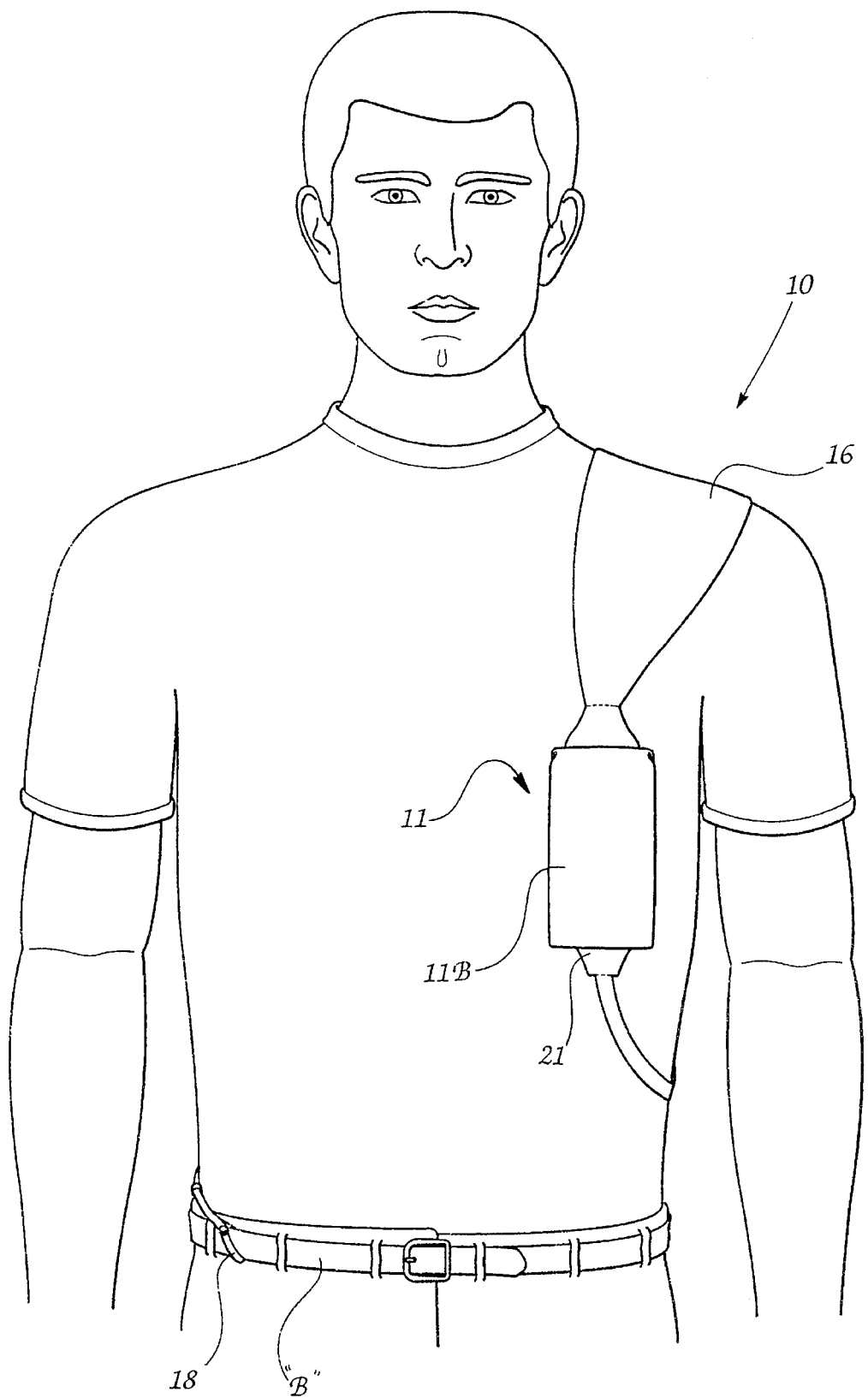
FIG. 1 is a view of the shoulder holster according to one preferred embodiment of the invention as worn by a user.

Referring now specifically to the drawings, a shoulder holster according to the present invention is illustrated in FIG. 1 and shown generally at reference numeral 10. The shoulder holster 10 is used for carrying portable telephone means 11, and for locating the telephone means 11 near the body of a user for safe and secure storage during periods of non-use.

The term "telephone means" is defined herein as preferably including both a portable telephone 11A, and a protective jacket 11B (See FIG. 3) for holding the telephone 11A therein. Alternatively, the telephone means 11 may include only a portable telephone 11A, or may include other telephone accessories and attachments not shown. The shoulder holster 10 provides ready and convenient access to the telephone 11A by the user for receiving in-coming calls and for placing out-going calls.

As shown in FIG. 2, the shoulder holster 10 includes side straps 14 and 15 and a supporting shoulder strap 16. The side straps 14 and 15 are attached at respective ends thereof to the shoulder strap 16, and extend generally diagonally across the back of the user during wear. The opposite respective ends of the side straps 14 and 15 are attached together, and preferably form a loop 18 for receiving a belt "B" of the user, as shown in FIG. 1. The shoulder strap 16 extends generally over the shoulder and under the arm of the user during wear, and includes a relatively wide section which rests on the shoulder for added comfort to the user and a relatively narrow section which extends under the arm.

Opposite ends of the shoulder strap 16 are attached to a telephone mounting panel 21. The mounting panel 21 resides near the chest of the user during wear, and includes hook fasteners 22 for being mated with complementary loop fasteners 23 located on a back wall of the jacket 11B to removably attach the telephone means 11 to the shoulder holster 10. The loop fasteners 23 of the jacket 11B are shown in FIG. 4. Alternatively, loop fasteners may be located on a front surface of the mounting panel 21, and hook fasteners located on the jacket 11B.

In another embodiment, loop fasteners are adhered directly to a back surface of the telephone 11A for removably attaching the telephone 11A to the shoulder holster 10 for ready access by the user. The loop fasteners may be adhered to the telephone 11A or the jacket 11B using any suitable adhesive.

In a third embodiment (not shown), complementary snap fasteners are located on the mounting panel and on the jacket. The snap fasteners are mated together for removably attaching the telephone means to the shoulder holster.

As best shown in FIG. 3, the protective jacket 11B preferably includes a top opening 26, a center opening 27 for exposing the push buttons of the telephone 11A, and sections of small holes 28 and 29 formed at opposite ends of the jacket 11B. The small holes 28 and 29 reside adjacent to the receiver and transmitter portions of the telephone 11A, respectively, and allow use of the telephone 11A without first removing the telephone 11A from the jacket 11B. In addition, a flap 31 may be attached to a top end of the jacket 11B for removably covering the top and center openings 26 and 27 of the jacket 11B. Preferably, the flap 31 extends over the entire front wall of the jacket 11B, and attaches to a bottom wall of the jacket 11B using complementary snap or hook and loop fasteners.

According to another embodiment (not shown), the shoulder holster includes only a shoulder strap and mounting panel. During wear, the shoulder strap extends generally over the shoulder of the user, diagonally across the back, and under the arm. Opposite ends of the shoulder strap are attached to the mounting panel, as described above. The mounting panel carries the telephone means, and resides near the chest of the user during wear for ready and convenient access to the telephone means by the user. As previously described, complementary snap fasteners or hook and loop fasteners may be used for removably attaching the telephone means to the mounting panel.

A shoulder holster, and method of carrying a portable telephone near the body of a user are described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. In combination with portable telephone means comprising a telephone and a protective jacket for holding the telephone therein, and said jacket including a front, substantially planar wall having respective transmitter and receiver openings residing adjacent to a transmitter and receiver portion of the telephone and a center window spaced from each of the receiver and transmitter openings for exposing a plurality of push buttons of said telephone, the jacket further including an attached flap for removably covering said transmitter and receiver openings and said center window, a shoulder holster for carrying the telephone means near the body of a user for storage of and ready access to the telephone means by the user, said holster comprising:

(a) a supporting shoulder strap having opposing ends and extending generally over the shoulder and under the arm of the user during wear;

(b) a telephone mounting panel attached to respective ends of the shoulder strap, and residing near the chest of the user during wear; and (c) complementary attachment means located on said mounting panel and on a back wall of said protective jacket for removably attaching the telephone means to said mounting panel.

2. A combination according to claim 1, wherein said attachment means comprises complementary hook and loop fasteners located, respectively, on a back wall of said jacket and on a front surface of said mounting panel for removably attaching the telephone means to said mounting panel.

3. A combination according to claim 1, and including a side strap having first and second ends, the first end being attached to said shoulder strap and the second end defining a loop for receiving a belt of the user.

4. In combination with portable telephone means comprising a telephone and a protective jacket for holding the telephone therein, and said jacket including a front, substantially planar wall having respective transmitter and receiver openings residing adjacent to a transmitter and receiver portion of the telephone and a center window spaced from each of the receiver and transmitter openings for exposing a plurality of push buttons of said telephone, the jacket further including an attached flap for removably covering said transmitter and receiver openings and said center window, a shoulder holster for carrying said telephone means near the body of a user for storage of and ready access to said telephone means by the user, said holster comprising:

(a) a supporting shoulder strap having opposing ends and extending generally over the shoulder and under the arm of the user during wear;

(b) a telephone mounting panel attached to respective ends of the shoulder strap, and residing near the chest of the user during wear;

(c) a side strap having first and second ends, the first end being attached to said shoulder strap and the second end defining a loop for receiving a belt of the user; and (d) attachment means comprising complementary hook and loop fasteners located on a back wall of said jacket and on a front surface of said mounting panel for removably attaching said telephone means to said mounting panel.

* * * * *